United States Patent [19]

Olson et al.

[11] 4,390,593
[45] Jun. 28, 1983

[54] LAMINATED GOB FOR PRESSING GLASS ARTICLES

[75] Inventors: John H. Olson, Newport News, Va.; Robert J. Schlaufman, Elmira, N.Y.

[73] Assignee: Corning Glass Works, Corning, N.Y.

[21] Appl. No.: 346,027

[22] Filed: Feb. 5, 1982

Related U.S. Application Data

[62] Division of Ser. No. 259,395, May 1, 1981.

[51] Int. Cl.$^3$ .......................... B32B 17/06; C03B 7/14
[52] U.S. Cl. ........................................ 428/410; 65/121;
65/122; 428/426; 428/428
[58] Field of Search ............... 428/410, 426, 427, 428;
65/86, 121, 122

[56] References Cited

U.S. PATENT DOCUMENTS

| | | | |
|---|---|---|---|
| 1,529,947 | 3/1925 | Freese | 65/121 |
| 2,500,105 | 3/1950 | Weber | 65/121 X |
| 3,351,449 | 11/1967 | Ambrogi | 65/122 |
| 3,582,306 | 6/1971 | Giffen | 65/121 |
| 3,673,049 | 6/1972 | Giffen et al. | 65/121 X |
| 4,023,953 | 5/1977 | Megles, Jr. et al. | 65/121 X |
| 4,130,680 | 12/1978 | Ference et al. | 428/410 X |
| 4,337,295 | 6/1982 | Rittler | 428/410 |

*Primary Examiner*—Thomas J. Herbert, Jr.
*Attorney, Agent, or Firm*—B. R. Turner

[57] ABSTRACT

Method and apparatus is set forth for forming a laminated gob or charge of molten glass having a core glass which is not only completely surrounded by a skin glass but also has a reentrant portion of skin glass which projects inwardly within the core glass from the periphery of the molten charge intermediate its upper and lower extent. The reentrant portion of skin glass is formed within the charge during the gobbing cycle by momentarily retarding or retracting the outward flow of the core glass while simultaneously positively pulsing the flow of the skin glass. Thus, a laminated gob or charge of molten glass is formed which not only has a skin glass completely surrounding and encompassing a core glass but also has a reentrant portion of the skin glass which is continuous with the remainder of the skin glass surrounding the core glass. The reentrant skin glass portion of the gob projects within the inner more fluid core glass, such that when the charge is pressed into a glass article, the reentrant skin glass is forced outwardly with the flow of the hotter central core glass so as to form a continuous uniform skin about the extremeties of the pressed article.

2 Claims, 4 Drawing Figures

LAMINATED GOB FOR PRESSING GLASS ARTICLES

This is a division of application Ser. No. 259,395, filed May 1, 1981.

BACKGROUND OF THE INVENTION

For some time now it has been possible for manufacturers of glass articles to form laminated articles, such as laminated tubing and laminated sheet glass wherein a continuous flow or stream of the composite glass is delivered to form such tubing or sheet as desired. U.S. Pat. Nos. 2,992,517 and 3,541,198 illustrate processes of forming continuous composite filaments, whereas U.S. Pat. No. 4,023,953 illustrates method and apparatus for continuously producing composite glass tubing. In the manufacture of both the filaments and the tubing, a continuous glass flow of the composite streams is necessary in order to form such filaments or tubing.

U.S. Pat. No. 3,582,306 sets forth method and apparatus for continuously forming a composite sheet or ribbon of molten glass directly from a plurality of flows of molten vitreous material, whereas U.S. Pat. No. 3,582,454 discloses method and apparatus for forming articles from such a continuous sheet of such composite material. In other words, molten glass is delivered to first form a continuous composite sheet of molten glass which is then subsequently formed and trimmed into various articles. U.S. Pat. No. 3,673,049 sets forth a plurality of compositions which may be utilized for forming both the composite sheet of the prior art and the composite encapsulated charge of molten glass of the present invention.

Whereas the prior art related to the formation of composite articles, such as tubing and sheet from a continuous flow of a composite glass, the present invention relates to the formation of individual articles from a discrete charge of molten glass having a core glass fully encapsulated within a skin glass, wherein the composite encapsulated charge of molten glass may be pressed into a laminated article having a core of one glass which is completely surrounded by a skin of a second glass. The use of stream feeding for forming individual charges of a single glass is shown in U.S. Pat. No. 3,351,449, however, the patent does not contemplate composite charges or the formation of laminated ware. Many applications exist for such pressed laminated ware which were not heretofore feasibly formable with the known technologies. For example, pressed articles may be formed with a core glass of a nondurable opal composition which is provided with a durable skin glass having a desired decoration or tinting. In a like manner, a charge having a core of an inexpensive glass could be encapsulated with a skin of photochromic glass which is press-formed into a laminated article having the core of the inexpensive glass completely surrounded by a skin of the photochromic glass. Further, by utilizing glass compositions disclosed in U.S. Pat. No. 3,673,049, the core and skin glasses may be chosen so as to provide a strengthened pressed laminated article having a compressive outer skin.

In addition to the formation of laminated tubing and sheet glass as shown in the aforementioned prior art, it has been known to combine multiple flows of molten glass so as to make variegated glasses used for the manufacture of variegated glass marbles as shown in U.S. Pat. No. 1,529,947. However, the process as shown in such patent was merely to combine two glasses of different colors, shear the depending glass into gobs and deposit the variegated glass in a mold for forming marbles. Although a patent indicates that a stream of glass of one color may be injected within the center of a flowing stream of glass of another color so as to form a solid tubular core of one color extending from the top to the bottom of the gob and surrounded on its sidewalls with glass of another color, and that the variegated glass may be formed into an article by any desired forming devices, the patent does not suggest or contemplate the formation of a discrete composite charge of molten glass having a core glass encapsulated within a skin glass, or the pressing of such composite encapsulated charge into a laminated article having a core of one glass which is completely surrounded by a skin of a second glass.

Commonly owned copending application Ser. No. 259,493 filed May 1, 1981, entitled "Forming Laminated Articles from a Composite Encapsulated Charge of Molten Glass" by R. R. Ambrogi sets forth the broad concept of forming laminated articles from a composite gob of molten glass having an inner core of one glass and an outer skin of a second glass. The present invention is actually an improvement upon the invention set forth in said copending application. That is, although laminated articles having a core of one glass surrounded by a skin of a second glass were successfully formed utilizing the invention set forth in said application, the skin on pressed articles had a tendency to become rather thin about outer peripheral edges thereof, particularly when pressing larger size articles. As the composite gob of molten glass was being pressed, the skin glass adjacent the top and bottom of the charge which is initially contacted by the plunger and mold during the pressing had a tendency to set up, whereas the hotter molten core glass tended to be squeezed radially outwardly into the finished article while materially thinning or breaking through the skin glass adjacent peripheral edge portions of the charge and the resulting article. The present invention sets forth a programmed gob which includes reentrant portions of the skin glass projecting within the core glass from peripheral edges of the gob, such that upon the pressing of the gob charge, sufficient skin glass is provided to compensate for the radially outward flow of the more fluid core glass during the pressing operation so that the finished article has a fairly uniform thickness of skin glass about its extent.

SUMMARY OF THE INVENTION

In its simplest form, the present invention set forth a completely new concept in forming a laminated gob for pressing glass articles. A discrete charge of molten glass is formed from a plurality of separate and distinct glasses with the core glass of one composition completely encapsulated within and surrounded by a skin glass of a second composition, and wherein the skin glass has a reentrant portion projecting radially inwardly within the core glass from a circumferential peripheral edge portion of the charge. In the formation of the gob charge, the core glass and skin glass are simultaneously delivered from a discharge orifice with the core glass flowing within and being completely surrounded by a flow of skin glass. During the gobbing cycle, the downward and outward flow of the core glass is momentarily retarded or interrupted, and may even be reversed, while simultaneously the downward flow of the surrounding skin glass is pulsed with positive pressure thereby filling the void created by the retarded flow of core glass with skin glass, and thus producing the reentrant skin portion within the core glass of the resulting charge. Thus, upon a pressing of the resulting composite charge, the reentrant skin glass provides for a substantially uniform thickness of skin glass about the more fluid core glass which is squeezed radially outwardly of the charge during the pressing of the same into a final article.

It thus has been an object of the present invention to expand upon the known technologies of forming laminated articles to provide a novel composite charge of molten glass having sufficient skin glass positioned therein such that upon the pressing of the charge, the skin glass will be of substantially uniform thickness about the entire final pressed article.

DESCRIPTION OF THE PREFERRED EMBODIMENTS

Figure 1:
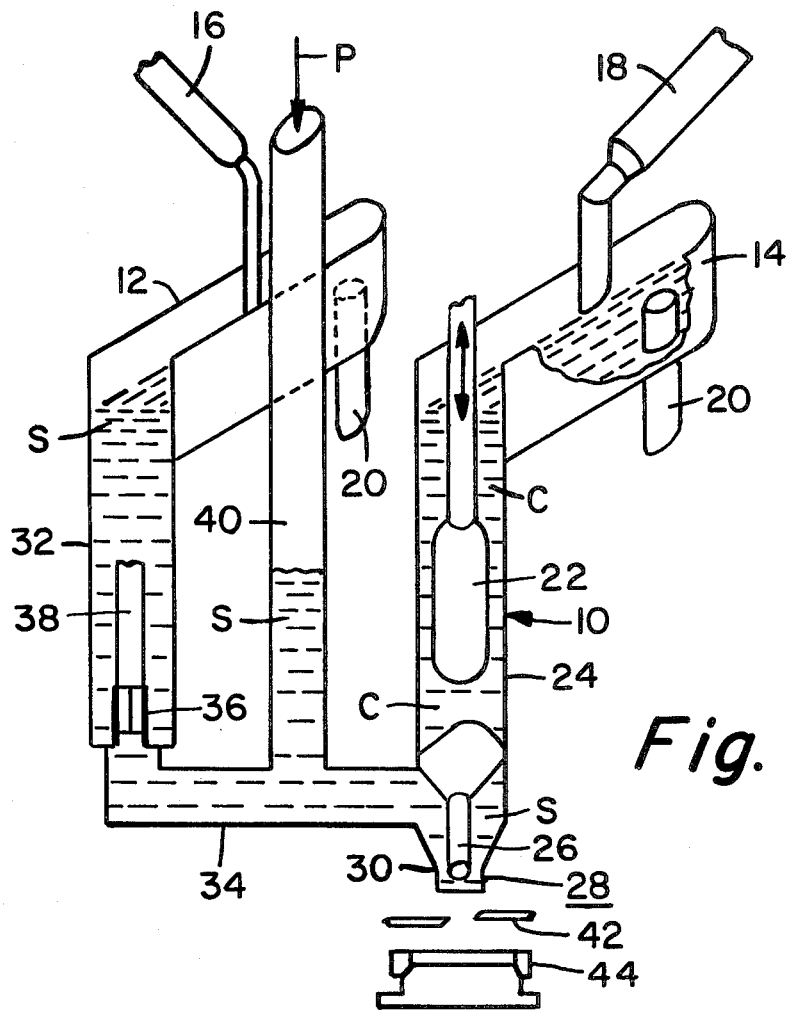
FIG. 1 is a somewhat schematic elevational view of an apparatus for forming a composite encapsulated charge of molten glass in accordance with the present invention.

Referring now to FIG. 1, a delivery apparatus 10 is shown having a pair of separate troughs 12 and 14 for receiving the skin glass S and core glass C, respectively. Molten skin glass S is delivered to the skin glass retaining trough 12 from a suitable supply thereof, such as a melting tank, by means of connector tube or passage 16. In a like manner, core glass C is delivered to the core glass retaining trough 14 from a suitable supply thereof, such as a core glass melting tank, by means of a connector tube or passage 18. The level in both of the troughs is not only controlled by adjusting the flow from the source, but also a suitable overflow pipe 20 may be positioned in each trough for maintaining the desired fluid level therewithin.

A core well 24, extending downwardly from core glass trough 14 and having a gobbing needle 22 operatively positioned therewithin, communicates with a central core glass retaining portion 26 of a discharge orifice 28. The skin glass trough 12 communicates with an outer skin glass retaining portion 30 of the discharge orifice 28 by means of a downflow pipe 32 and a connecting transverse conduit 34. The flow of skin glass S through a passage 36, connecting the downflow pipe 32 and transverse conduit 34, is controlled by a vertically movable star needle 28 operatively positioned within the passage 36. A pulse tube 40 for periodically receiving desired gaseous pulses or pneumatic pressure P is connected to transverse conduit 34 intermediate core well 24 and downflow pipe 32, and receives skin glass S therewithin from the transverse conduit 34. A pair of shears 42 are operatively positioned below discharge orifice 28, and a plurality of suitable molds such as 44 are indexable in an operable position below the orifice for receiving a laminated gob charge therefrom.

Figure 2:
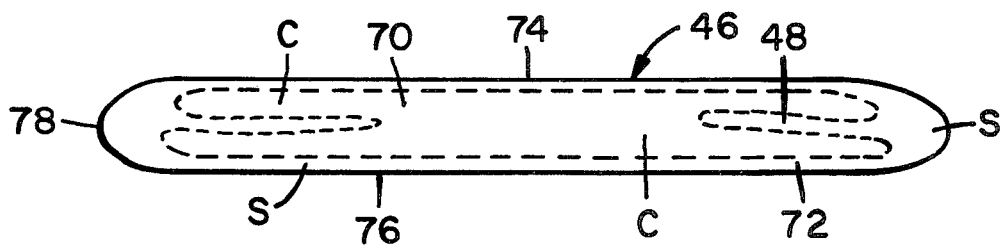
FIG. 2 is a schematic elevational view illustrating a composite charge having reentrant skin glass portions as formed by the apparatus shown in FIG. 1.

Referring now to FIG. 2, a laminated gob or charge 46, such as delivered by apparatus 10 from orifice 28, is shown comprising a central portion 70 formed of core glass C completely surrounded by and encapsulated within an outer portion 72 formed of skin glass S. The skin glass portion 72 has a reentrant portion 48 which is continuous with the peripheral skin glass S but which projects radially within the core glass C intermediate the upper and lower extent of the charge 46. The gob or charge 46, upon being delivered to a mold or forming surface, has a disc shape with substantially flat upper and lower surfaces, 74 and 76 respectively, and bounded by an outer circumferential peripheral portion 78 intermediate the upper and lower surfaces.

Figure 3:
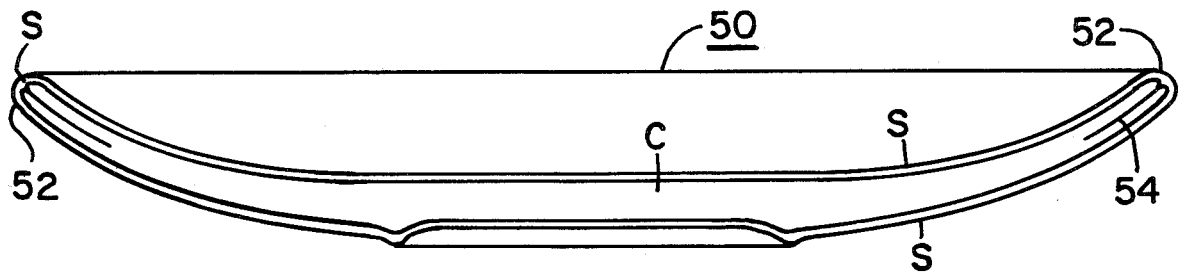
FIG. 3 is a schematic elevational view in section of a pressed article formed from the charge shown in FIG. 2.

When the charge 46 is pressed into a finished article, such as the dish 50 of FIG. 3, the lower skin surface 76 of the charge 46 is initially engaged by the mold, and the upper skin surface 74 of the charge 46 is initially engaged by the plunger, with the result that the lower and upper skin surfaces 76 and 74 of the charge 46 are initially cooled and partially set up by the cooler contacting surfaces of the mold and plunger. Thus, as the laminated charge 46 is pressed, the hotter more fluid central portion 70 of core glass C is forced radially outwardly as the charge is compressed and squeezed into the final article 50. Were it not for the reentrant skin glass portion 48, which extends radially inwardly from about the periphery 78 of the charge 46, the more fluid core glass C would have a tendency to just squirt out of or materially thin the encompassing skin glass S adjacent the periphery 78 of the charge, which would result in a finished article having extremely thin skin areas about its outer pheriphery.

However, by forming the laminated charge 46 with the reentrant skin glass portion 48 in accordance with the process of the present invention, upon the pressing of the charge 46 into a finished article, the more fluid central core glass C flows radially outwardly but carries with it the reentrant skin portion 48 so that the finished article is provided with a substantially uniform thickness of skin glass about its extent, including the outer peripheral portions of the pressed article. That is, instead of the more fluid central core glass portion 70 having the tendency to merely thin out or squirt through an outer layer 72 of enclosing skin glass, the reentrant skin glass configuration of the charge of the present invention flows outwardly ahead of and along with the fluid core glass so as to maintain a substantially uniform skin about the core glass as it is flown into its final pressed state, thereby achieving more uniform skin glass coverage about the core glass in the finished article than would be obtainable were the reentrant skin glass configuration not utilized.

As noted in FIG. 3, the finished pressed article 50 has a central core glass portion C completely surrounded and encompassed by a skin glass portion S. Further, the skin S is of substantially uniform thickness, even about the outer peripheral portions 52 of the pressed article 50, and a slight reentrant portion of skin glass 54 may even remain in the finished article adjacent to and projecting inwardly of the outer peripheral portion 52.

The process for forming the improved laminated gob 46 of the present invention having the reentrant skin glass portion will be described with reference to the delivery apparatus 10 of FIG. 1. The core glass C is supplied to the core glass trough 14 from a suitable source thereof by connector passage 18 and maintained at a desired level such as by overflow pipe 20. The core glass flows downwardly within core well 24 to the central portion 26 of the discharge orifice 28 and is controlled by reciprocal gobbing needle 22. The needle may be operated by a standard cam-actuated hydraulic feeder. In a like manner, skin glass S is delivered from a suitable source thereof by means of connector passage 16 to the skin glass retaining trough 12 and maintained at a desired level such as by means of overflow pipe 20. The skin glass flows downwardly through downflow pipe 32, into transverse conduit 34, and into the outer skin glass retaining portion 30 of discharge orifice 28. The vertical position of star needle 38 within passage 36 varies the resistance to flow of the skin glass therethrough, and accordingly the standard rate of flow of skin glass from the trough 12 to orifice 28. In view of the fact that the pulse tube 40 is open to the transverse conduit 34, skin glass S also flows upwardly within the pulse tube 40.

During a typical gobbing cycle wherein the core glass C within the central core glass retaining portion 26 is completely surrounded by the skin glass S within the outer skin glass retaining portion 30, and wherein the glasses are in actual physical contact with one another within the discharge orifice 28, the orifice is operated in the following manner:

(a) The gobbing needle 22 within core well 24 is moved upwardly which retracts the flow of core glass emanating from central retaining portion 26, and in view of the fact that the skin glass surrounding such core glass within discharge orifice 28 physically adheres thereto, the skin glass is also retracted. As the gobbing needle 22 nears the end of its upward travel, the water-cooled shears 42 cut the trailing stream flowing from the discharge orifice 28.

(b) A collection mold 44 is indexed under the orifice 28.

(c) The gobbing needle is then moved downwardly, forcing the core glass outwardly through the central retaining portion 26, while skin glass simultaneously freely flows under steady state operation outwardly from outer retaining portion 30 about the core glass.

(d) The downward movement of the gobbing needle 22 is then momentarily stopped and reversed so as to retard the flow of the molten core glass from the central retaining portion 26, and simultaneously a pulse of pressurized air or gaseous media P is applied to the pulse tube 40 so as to pulse or force the skin glass S outwardly through the outer retaining portion 30 of orifice 28 and into the void created during the period of low core glass flow. The pressurized air drives the skin glass out of the pulse tube 40 and increases the amount of flow of skin out of the orifice 28 than had flowed during the steady state operation. Also, the star needle provides a resistance which allows a portion of the skin glass displaced from the pulse tube to flow toward the skin trough 12.

(e) After the momentary reversal of the gobbing needle 22, it continues its downward movement and the pulse applied to the skin glass is discontinued such that a normal gobbing cycle is resumed.

(f) At the completion of its downward gobbing movement, the gobbing needle 22 resumes its upward movement, the glass is sheared by shears 42, and the collection mold 44 is indexed out from under the orifice into a pressing position.

(g) The flow of skin and core glasses from the orifice are then in steady state conditions as new skin glass flowing down downflow pipe 32 and through star needle controlled passage 36 fills the pulse tube 40 while the driving needle 22 continues its slow climb to the top of its travel.

Figure 4:
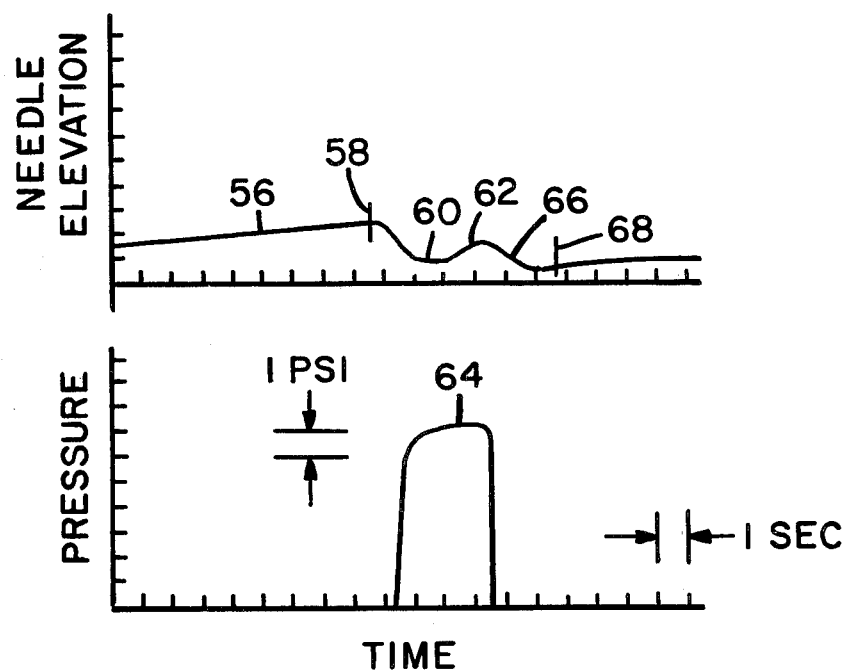
FIG. 4 is a composite graph illustrating a gobbing cycle utilized with the core and skin glasses to form the composite gob shown in FIG. 2.

Referring now to FIG. 4, a graphical illustration of both the gobbing needle movement for the core glass and the pulsing of the skin glass is shown. Referring to the upper graph portion, the line 56 represents the travel of gobbing needle 22 during each cycle. As shown, the needle begins its slow climb toward the top of its travel whereupon the shear blades 42 make a first shear cut as shown by line 58, and the needle begins its downward travel in the ordinary course of a gobbing cycle. However, the downward travel is interrupted at 60, and reverses as shown at 62 in an upward direction. Simultaneously, as will be noted by the lower part of the graph of FIG. 4, the skin glass is provided with a pulse of pressurized air as shown by the line graph 64. The needle 22 then continues its downward movement as shown at 66 and the pulse is terminated, whereupon at the end of the cycle, the needle begins its rise upwardly and a second shear cut is made as shown by line 68, and the cycle is repeated. In the illustration shown, the needle travel from shear cut to shear cut is about 6 seconds, with the interruption and reversal of the needle during the middle of the cycle consuming between about 2 to 3 seconds, while the pulse of gaseous media also consumes about 2 to 3 seconds at about 7 psi. during such interruption.

It thus can be seen from the foregoing description that the present invention sets forth a novel method of forming a laminated gob having a core of one glass which is not only completely surrounded by a skin of a second glass, but also has a reentrant portion of said skin glass projecting radially inwardly within the core glass from a circumferential peripheral portion of the skin glass, such that the reentrant portion is intermediate the upper and lower extent of the delivered gob charge. The provision of such a laminated gob having the skin glass so programmed into the core glass is accomplished by momentarily stopping and actually reversing the downward travel of the core glass gobbing needle, so as to interrupt the flow of core glass while simultaneously applying a pulse of pressurized gas or air to the skin glass so as to fill the void, created in the gob by the retarded flow of core glass, with skin glass. The resulting programmed laminated gob provides a charge for pressing a finished laminated article having a core of one glass which is completely surrounded by a substantially uniform skin of a second glass, even though the finished pressed article may have an outer periphery substantially larger than that of the gob charge.

Although the preferred embodiments of the invention have been disclosed herein, it is appreciated that various changes and modifications may be made thereto without departing from the spirit and scope of the invention as set forth in the appended claims. For example, if desired, the skin glass flow could be controlled by a conventional vertically reciprocal needle positioned within the downflow pipe, and similarly, the flow of the core glass could be controlled by connecting a suitable source of pressure or vacuum to the core well for controlling the flow of the core glass through the central orifice.

I claim:

1. A laminated charge of molten glass for use in forming a laminated article having a core of one glass which is completely surrounded by a substantially uniform thickness of a skin of a second glass comprising, a charge of molten glass having upper and lower surface portions and an outer circumferential peripheral portion intermediate said upper and lower surface portions, said charge having an inner central core glass portion encompassed within an outer skin glass portion, and said skin glass portion having a reentrant portion projecting radially within said core glass portion from said outer circumferential peripheral portion intermediate the upper and lower extent of said charge of molten glass.

2. A laminated charge of molten glass as defined in claim 1 wherein said charge of molten glass is in the form of a disc shape having substantially flat upper and lower surface portions, and said reentrant skin glass portion is continuous with the outer skin glass portion and projects within the core glass from said outer circumferential portion intermediate said substantially flat upper and lower surface portions.

* * * * *

UNITED STATES PATENT AND TRADEMARK OFFICE
CERTIFICATE OF CORRECTION

PATENT NO. : 4,390,593
DATED : June 28, 1983
INVENTOR(S) : John H. Olson and Robert J. Schlaufman It is certified that error appears in the above-identified patent and that said Letters Patent are hereby corrected as shown below:

Column 1, line 39, insert "composite" between "discrete" and "charge".

Column 2, line 4, "a", first occurrence, should be --the--

Column 2, line 51, "set" should be --sets--.

Column 3, line 59, "28" should be --38--.

Signed and Sealed this

Eighth Day of November 1983

[SEAL]

Attest:

GERALD J. MOSSINGHOFF

Attesting Officer    Commissioner of Patents and Trademarks